US012608947B2

(12) United States Patent
Song et al.

(10) Patent No.: US 12,608,947 B2
(45) Date of Patent: Apr. 21, 2026

(54) SYSTEM AND DEVICE FOR COUNTING PEOPLE IN SIDE VIEW IMAGE

(71) Applicant: HANWHA VISION CO., LTD., Seongnam-si (KR)

(72) Inventors: Changho Song, Seongnam-si (KR); Hyunhak Shin, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 227 days.

(21) Appl. No.: 18/344,825

(22) Filed: Jun. 29, 2023

(65) Prior Publication Data

US 2024/0005665 A1 Jan. 4, 2024

(30) Foreign Application Priority Data

Jun. 29, 2022 (KR) ........................ 10-2022-0079532
Jun. 14, 2023 (KR) ........................ 10-2023-0076224

(51) Int. Cl.
*G06V 10/776* (2022.01)
*G06V 10/22* (2022.01)
*G06V 10/94* (2022.01)
*G06V 20/52* (2022.01)
*G06V 40/16* (2022.01)

(52) U.S. Cl.
CPC ............ *G06V 20/53* (2022.01); *G06V 10/225* (2022.01); *G06V 10/945* (2022.01); *G06V 40/166* (2022.01)

(58) Field of Classification Search
CPC ........ H04N 23/23; G06V 10/16; G06V 40/10; B60R 25/25
See application file for complete search history.

(56) References Cited

U.S. PATENT DOCUMENTS

| 9,798,388 B1* | 10/2017 | Murali ................. G06F 3/0487 |
| 2005/0285356 A1* | 12/2005 | Malit .................... B60G 17/00 |
| | | 280/5.518 |
| 2008/0212099 A1 | 9/2008 | Chen |
| 2010/0110308 A1* | 5/2010 | Nicholson ........... H04N 9/3164 |
| | | 353/31 |

(Continued)

FOREIGN PATENT DOCUMENTS

WO 2021075772 A1 4/2021

OTHER PUBLICATIONS

Swedish Office Action issued on Dec. 20, 2023 for patent application 2350770-0.

(Continued)

*Primary Examiner* — Jayanti K Patel
(74) *Attorney, Agent, or Firm* — McLean IP Global; Jason Y. Pahng

(57) ABSTRACT

A surveillance camera and a control method for the surveillance camera are disclosed. The present disclosure makes it possible to determine whether at least one of a bounding box for a head region of an objected detected from a side view image and a bounding box for an entire body region thereof intersects a preset counting line, thereby counting people passing through the counting line. In the present disclosure, one or more of a surveillance camera, an autonomous vehicle, a user terminal, and a server may be linked to an artificial intelligence module, a robot, an augmented reality (AR) device, a virtual reality (VT) device, and a 5G service.

18 Claims, 12 Drawing Sheets

(56)  References Cited

U.S. PATENT DOCUMENTS

| | | | | |
|---|---|---|---|---|
| 2010/0111370 | A1* | 5/2010 | Black | G06F 18/2321 |
| | | | | 705/26.1 |
| 2011/0080336 | A1* | 4/2011 | Leyvand | G06F 3/017 |
| | | | | 382/103 |
| 2011/0190055 | A1* | 8/2011 | Leyvand | A63F 13/40 |
| | | | | 463/36 |
| 2012/0323365 | A1* | 12/2012 | Taylor | G05D 1/0225 |
| | | | | 901/1 |
| 2013/0016379 | A1* | 1/2013 | Lou | B42D 15/00 |
| | | | | 358/1.9 |
| 2013/0094780 | A1* | 4/2013 | Tang | G06T 11/60 |
| | | | | 382/284 |
| 2014/0347475 | A1* | 11/2014 | Divakaran | G06V 20/52 |
| | | | | 348/135 |
| 2015/0049308 | A1* | 2/2015 | Mealing | G03B 17/54 |
| | | | | 353/121 |
| 2015/0213702 | A1* | 7/2015 | Kimmel | G06V 20/52 |
| | | | | 382/103 |
| 2015/0296200 | A1* | 10/2015 | Grauer | G01S 17/18 |
| | | | | 348/49 |
| 2016/0343169 | A1* | 11/2016 | Mullins | G01S 17/89 |
| 2016/0371884 | A1* | 12/2016 | Benko | G06T 19/006 |
| 2016/0379405 | A1* | 12/2016 | Baca | A63F 13/52 |
| | | | | 463/32 |
| 2017/0115395 | A1* | 4/2017 | Grauer | G01S 17/89 |
| 2017/0244908 | A1* | 8/2017 | Flack | G11B 27/036 |
| 2018/0047193 | A1 | 2/2018 | Gao et al. | |
| 2018/0176541 | A1* | 6/2018 | Abbas | H04N 23/90 |
| 2019/0122425 | A1* | 4/2019 | Sheffield | H04N 13/243 |
| 2019/0130189 | A1* | 5/2019 | Zhou | G06V 10/7515 |
| 2019/0130580 | A1 | 5/2019 | Chen et al. | |
| 2019/0170510 | A1* | 6/2019 | Robinson | G01C 9/00 |
| 2019/0220100 | A1* | 7/2019 | Kramer | G06F 3/147 |
| 2019/0279481 | A1* | 9/2019 | Silberschatz | G08B 21/0208 |
| 2019/0388049 | A1* | 12/2019 | Gupta | A61B 6/5217 |
| 2020/0042834 | A1* | 2/2020 | Distler | G06V 20/653 |
| 2020/0082851 | A1* | 3/2020 | Chau | G11B 27/031 |
| 2020/0193628 | A1 | 6/2020 | Chakraborty et al. | |
| 2020/0234480 | A1* | 7/2020 | Volkov | G06V 40/171 |
| 2020/0302159 | A1* | 9/2020 | Yellepeddi | G06V 40/172 |
| 2020/0327465 | A1* | 10/2020 | Baek | G16H 50/20 |
| 2020/0368616 | A1* | 11/2020 | Delamont | H04N 13/239 |
| 2020/0395105 | A1* | 12/2020 | Koby | G06V 20/20 |
| 2020/0410224 | A1* | 12/2020 | Goel | G05D 1/0212 |
| 2021/0001885 | A1* | 1/2021 | Zhang | B60W 50/14 |
| 2021/0118173 | A1* | 4/2021 | Wu | G06T 7/74 |
| 2021/0153479 | A1* | 5/2021 | Mindel | A01K 29/005 |
| 2021/0201021 | A1* | 7/2021 | Novelli | G06F 3/013 |
| 2021/0224603 | A1* | 7/2021 | Yan | G06V 10/255 |
| 2021/0248360 | A1 | 8/2021 | Park | |

OTHER PUBLICATIONS

Swedish Search Report issued on Dec. 20, 2023 for patent application 2350770-0.

* cited by examiner

SYSTEM AND DEVICE FOR COUNTING PEOPLE IN SIDE VIEW IMAGE

CROSS REFERENCE TO RELATED APPLICATIONS

This application claims priority from and the benefit of Korean Patent Application No. 10-2022-0079532, filed on Jun. 29, 2022 and Korean Patent Application No. 10-2023-0076224, filed on Jun. 14, 2023, which are hereby incorporated by reference for all purposes as if fully set forth herein.

BACKGROUND

Field

The present disclosure relates to a surveillance camera and a control method for the surveillance camera.

Discussion of the Background

With the recent development and progress in the detection of people using artificial intelligence technology, there is a fast-growing demand for use of methods for counting people from various angles of view. Imaging system-based people counting algorithms are used to measure foot traffic in a particular place by receiving image information. They are installed in a variety of places such as shopping malls, hospitals, hotels, etc., and used for marketing improvement, staff planning, and other purposes. Through the present disclosure, people can be counted from various side views, which allows for applications in more various places.

In conventional techniques for measuring the number of people, image sensors are used to obtain information on people, usually by using information detected with respect to the head of the person. These techniques are difficult to apply to side views, and, even if they are applicable, it is highly likely that the sensors will deliver low performance and will not function properly.

SUMMARY

The conventional techniques mostly use information of detecting the head of the person from a top view in order to count the number of people. Top view is used because redundant detection may result when people overlap with one another, which can lead to inaccuracy of information. However, the recent use of artificial intelligence enables more accurate detection of people, and, based upon this, it is necessary to develop a technique of counting the number of people from various side views.

The present disclosure has been made to solve the above-mentioned problems, and provides a surveillance camera that provides a side view and counts people based on information from bounding boxes for people passing through a particular area, and a control method for the surveillance camera.

An example of the present disclosure provides a surveillance camera including: an image sensor; and a processor that performs counting if at least one of a first bounding box and a second bounding box intersects a preset counting line, the first bounding box and the second bounding box indicating a head region and entire body region, respectively, of a person detected from an image obtained by the image sensor, wherein, if the first bounding box and the second bounding box originate from the same object, the processor controls such that counting is performed only by either the first bounding box or the second bounding box.

The image sensor may include an image sensor that obtains image data from the surveillance camera.

If the first bounding box and the second bounding box originate from the same object, the processor may link the first and second bounding boxes to each other.

If the first bounding box is contained in the second bounding box, the first bounding box and the second bounding box may be deemed as originating from the same object.

The processor may perform up-counting if the second bounding box intersects the counting line at at least one point the instant the first bounding box traverses the counting line.

The processor may selectively use either the first bounding box or the second bounding box depending on the proximity of the counting line to the object to determine whether the applied bounding box intersects the counting line.

If the object is proximate to an end of the counting line, the processor may use the second bounding box to determine whether the second bounding box intersects the counting line.

The processor may selectively use either the first bounding box or the second bounding box depending on the height of the counting line to determine whether the applied bounding box intersects the counting line, If the height of the counting line is lower in comparison, the second bounding box may be applied to determine whether the second bounding box intersects the counting line.

If there are a plurality of different objects traversing the counting line simultaneously, and at least one of the plurality of objects overlaps with at least one other object, for the plurality of overlapping objects the first bounding box may be utilized in determining whether the plurality of overlapping objects intersect the counting line.

If there are more first bounding boxes for the plurality of objects than second bounding boxes, the processor may determine that the at least one object overlaps with at least one other object.

If there are a plurality of different objects traversing the counting line simultaneously, and no second bounding box is detected from at least one of the plurality of objects, the processor may use a virtual second bounding box and determine whether the virtual second bounding box intersects the counting line.

The processor may set the height of the virtual second bounding box based on the height of a second bounding box of one of the plurality of objects from which the second bounding box is detected.

The processor may recognize the type of the counted object and output an alarm if the object is not authorized for access.

The counting line may be set within the image based on a predetermined user input.

The processor may recognize an entrance area within the image, and upon receiving an input for designating the entrance area, automatically set the counting line to a position corresponding to the entrance area.

The processor may automatically set the counting line to the height of the entrance area.

Another example of the present disclosure provides a control method for a surveillance camera, the control method including: detecting a person in a side view image from which the entire body of the detected person including the face; detecting a head region and entire body region of the detected person; extracting a first bounding box corresponding to the head region and a second bounding box corresponding to the entire body region; performing counting if the second bounding box intersects a preset counting line; and performing counting if the first bounding box intersects the counting line but there is no bounding box linked to the first bounding box. The control method for the surveillance camera may further include linking the first and second bounding boxes to each other if the first bounding box and the second bounding box originate from the same object.

The first bounding box may be contained in the second bounding box.

The control method for the surveillance camera may further comprise detecting the first bounding box traversing the counting line; and performing counting if the second bounding box intersects the counting line at at least one point the instant the first bounding box traverses the counting line.

The control method for the surveillance camera may further include: if the object is proximate to an end of the preset counting line, determining whether the second bounding box intersects the counting line and performing counting.

The control method for the surveillance camera may further include selecting either the first bounding box or the second bounding box based on the relative heights of the preset counting line and the object to determine whether the applies bounding box intersects the counting line.

Yet another example of the present disclosure provides a surveillance camera including: an image sensor; and a processor that detects a first bounding box and a second bounding box, which indicate two different regions, respectively, of an object detected from a side view image obtained by the image sensor, and performs counting based on the relative positions of the first and second bounding boxes, if at least one of the first and second bounding boxes intersects the counting line when the object traverses the counting line.

The detected object may be a human, and the two different regions may include a head region and entire body region of the detected human.

The processor may link the first bounding box corresponding to the head region and the second bounding box corresponding to the entire body region to each other, and recognize the linked first and second bounding boxes as originating from the same object.

If the linked first and second bounding boxes each intersect the counting line at at least one point, the processor may control such that up-counting is performed only once.

If only a first bounding box is detected from the detected object, the processor may determine that the body of at least one of at least two people detected from the side view image is at least partially obscured by another person, and use a virtual second bounding box of a certain size to the detected object to determine whether the virtual second bounding box intersects the counting line.

The virtual second bounding box of a certain size may correspond in size to the second bounding box extracted from the object from which the second bounding box is detected in the side view image.

A surveillance camera and a control method for the surveillance camera according to an example of the present disclosure can enhance the reliability of object counting in a surveillance camera that provides a side view.

The effects to be achieved by the present disclosure are not limited to the above-mentioned effects, and other effects not mentioned may be clearly understood by those skilled in the art from the following description.

BRIEF DESCRIPTION OF THE DRAWINGS

The accompanying drawings, included as part of the detailed description in order to help understanding of the present disclosure, provide examples of the present disclosure and describe the technical characteristics of the present disclosure along with the detailed description.

The accompany drawings, which are included as part of the detailed description in order to help understanding of the present disclosure, provide examples of the present disclosure and describe the technical characteristics of the present invention along with the detailed description.

DETAILED DESCRIPTION

Hereinafter, examples of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of examples of the disclosure and do not limit technical spirits of the disclosure, and the examples should be construed as including all modifications, equivalents, and alternatives falling within the spirit and scope of the examples.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Figure 1:
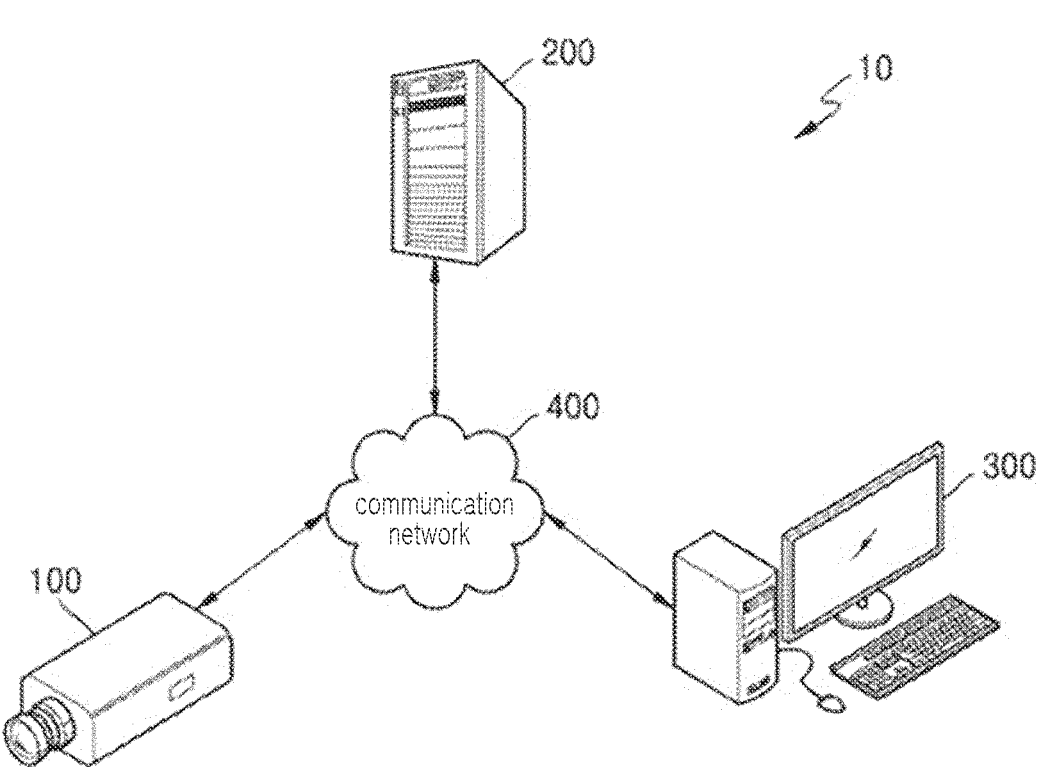
FIG. 1 is a view for illustrating a surveillance camera system to which a control method for a surveillance camera according to an example of the present disclosure is applied.

FIG. 1 is a diagram illustrating a surveillance camera system in which a method for controlling a surveillance camera according to an example of the present disclosure is implemented. Referring to FIG. 1, a surveillance camera system 10 according to one example of the present disclosure may include an image capturing device 100 and an image management server 200. The image capturing device 100 may be an electronic image capturing device disposed at a fixed location in a specific place, may be an electronic image capturing device that may be moved automatically or manually along a predetermined path, or may be an electronic image capturing device that may be moved by a person or a robot. The image capturing device 100 may be an IP (Internet protocol) camera connected to the wired/wireless Internet and used. The image capturing device 100 may be a PTZ (pan-tilt-zoom) camera having pan, tilt, and zoom functions. The image capturing device 100 may have a function of recording a monitored area or taking a picture. The image capturing device 100 may have a function of recording a sound generated in a monitored area. When a change, such as movement or sound occurs in the monitored area, the image capturing device 100 may have a function of generating a notification or recording or photographing. The image capturing device 100 may receive and store the trained object recognition learning model from the image management server 200. Accordingly, the image capturing device 100 may perform an object recognition operation using the object recognition learning model.

The image management server 200 may be a device that receives and stores an image as it is captured by the image capturing device 100 and/or an image obtained by editing the image. The image management server 200 may analyze the received image to correspond to the purpose. For example, the image management server 200 may detect an object in the image using an object detection algorithm. An AI-based algorithm may be applied to the object detection algorithm, and an object may be detected by applying a pre-trained artificial neural network model.

Meanwhile, the image management server 200 may store various learning models suitable for the purpose of image analysis. In addition to the aforementioned learning model for object detection, a model capable of acquiring object characteristic information that allows the detected object to be utilized may be stored. The image management server 200 may perform an operation of training the learning model for object recognition described above.

Meanwhile, the model for object recognition may be trained in the aforementioned image management server 200 and transmitted to the image capturing device 100, but training of the object recognition model and re-training of the model are performed in the image capturing device 100.

In addition, the image management server 200 may analyze the received image to generate metadata and index information for the corresponding metadata. The image management server 200 may analyze image information and/or sound information included in the received image together or separately to generate metadata and index information for the metadata.

The surveillance camera system 10 may further include an external device 300 capable of performing wired/wireless communication with the image capturing device 100 and/or the image management server 200.

The external device 300 may transmit an information provision request signal for requesting to provide all or part of an image to the image management server 200. The external device 300 may transmit an information provision request signal to the image management server 200 to request whether or not an object exists as the image analysis result. In addition, the external device 300 may transmit, to the image management server 200, metadata obtained by analyzing an image and/or an information provision request signal for requesting index information for the metadata.

The surveillance camera system 10 may further include a communication network 400 that is a wired/wireless communication path between the image capturing device 100, the image management server 200, and/or the external device 300. The communication network 400 may include, for example, a wired network, such as LANs (Local Area Networks), WANs (Wide Area Networks), MANs (Metropolitan Area Networks), ISDNs (Integrated Service Digital Networks), and a wireless network, such as wireless LANs, CDMA, Bluetooth, and satellite communication, but the scope of the present disclosure is not limited thereto.

The image capturing device 100 may receive and store an object recognition learning model trained in the image management server 200. Accordingly, the image capturing device 100 may perform an object recognition operation using the object recognition learning model.

Figure 2:
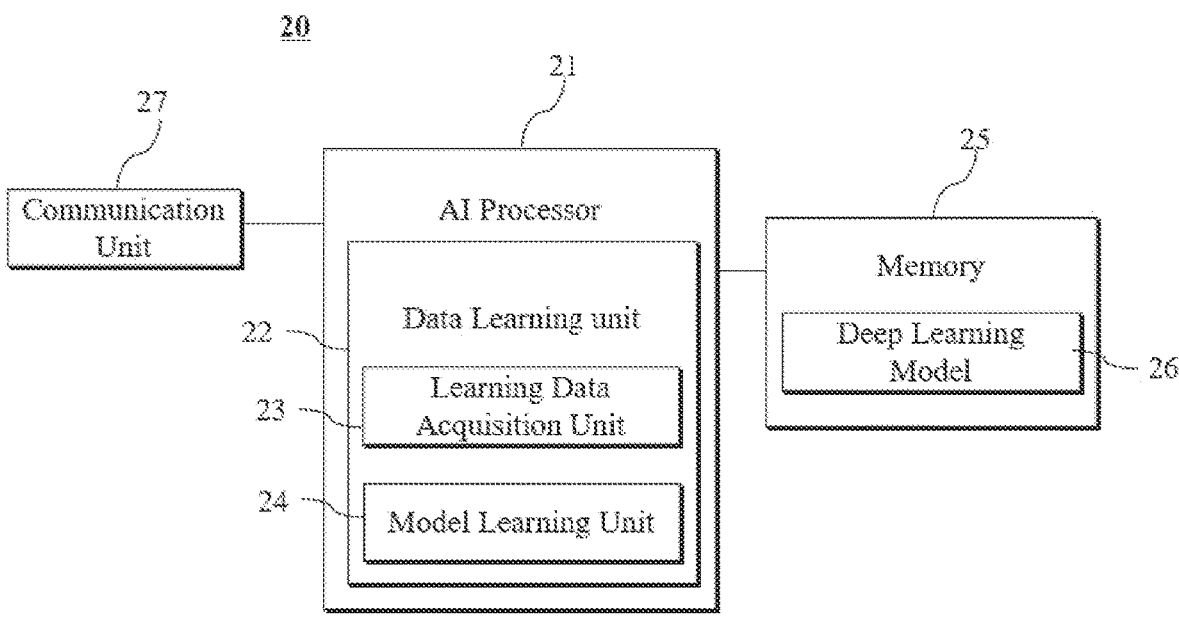
FIG. 2 is a view for illustrating an AI device (module) applied in training an object recognition model according to an example of the present disclosure.

FIG. 2 is a diagram illustrating an AI (artificial intelligence) device (module) applied to training of the object recognition model according to one example of the present disclosure.

Examples of the present disclosure may be implemented through a computing device for training a model for object recognition, and the computing device may include the image management server 200 (see FIG. 1) described in FIG. 1, but the present disclosure is not limited thereto, and a dedicated device for training an AI model for recognizing an object in an image may also be included. The dedicated device may be implemented in the form of a software module or hardware module executed by a processor, or in the form of a combination of a software module and a hardware module.

Hereinafter, the dedicated AI device 20 for implementing the object recognition learning model will be described in FIG. 2, and a block configuration for implementing an object recognition learning model according to one example of the present disclosure in the image management server 200 (see FIG. 1) will be described in FIG. 3. All or at least some of the functions common to the model training function described in FIG. 2 may be directly applied to FIG. 3, and in describing FIG. 3, redundant descriptions of functions common to FIG. 2 will be omitted.

Referring to FIG. 2, the AI device 20 may include an electronic device including an AI module capable of performing AI processing, or a server including an AI module.

In addition, the AI device 20 may be included the image capturing device 100 or the image management server 200 as at least a part thereof to perform at least a portion of AI processing together.

The AI processing may include all operations related to a control unit of the image capturing device 100 or the image management server 200. For example, the image capturing device 100 or the image management server 200 may AI-process the obtained image signal to perform processing/determination and control signal generation operations.

The AI device 20 may be a client device that directly uses the AI processing result or a device in a cloud environment that provides the AI processing result to other devices. The AI device 20 is a computing device capable of learning a neural network, and may be implemented in various electronic devices, such as a server, a desktop PC, a notebook PC, and a tablet PC.

The AI device 20 may include an AI processor 21, a memory 25, and/or a communication unit 27.

Here, the neural network for recognizing data related to image capturing device (100) may be designed to simulate the brain structure of human on a computer and may include a plurality of network nodes having weights and simulating the neurons of human neural network. The plurality of network nodes may transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and may transmit and receive data in accordance with a convolution connection relationship. The neural network, for example, includes various deep learning techniques, such as deep neural networks (DNN), convolutional deep neural networks (CNN), recurrent neural networks (RNN), a restricted boltzmann machine (RBM), deep belief networks (DBN), and a deep Q-network, and may be applied to fields, such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 may store various programs and data for the operation of the AI device 20. The memory 25 may be a nonvolatile memory, a volatile memory, a flash-memory, a hard disk drive (HDD), solid state drive (SDD), or the like. The memory 25 is accessed by the AI processor 21 and reading-out/recording/correcting/deleting/updating, etc. Of data by the AI processor 21 may be performed. Further, the memory 25 may store a neural network model (e.g., a deep learning model 26) generated through a learning algorithm for data classification/recognition according to an example of the present disclosure.

Meanwhile, the AI processor 21 may include a data learning unit 22 that learns a neural network for data classification/recognition. The data learning unit 22 may learn references about what learning data are used and how to classify and recognize data using the learning data in order to determine data classification/recognition. The data learning unit 22 may learn a deep learning model by acquiring learning data to be used for learning and by applying the acquired learning data to the deep learning model.

The data learning unit 22 may be manufactured in the type of at least one hardware chip and mounted on the AI device

20. For example, the data learning unit 22 may be manufactured in a hardware chip type only for artificial intelligence, and may be manufactured as a portion of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that may be read through a computer. In this case, at least one software module may be provided by an OS (operating system) or may be provided by an application.

The data learning unit 22 may include a learning data acquiring unit 23 and a model learning unit 24.

The learning data acquisition unit 23 may acquire learning data required for a neural network model for classifying and recognizing data.

The model learning unit 24 may perform learning such that a neural network model has a determination reference about how to classify predetermined data, using the acquired learning data. In this case, the model learning unit 24 may train a neural network model through supervised learning that uses at least some of learning data as a determination reference. Alternatively, the model learning data 24 may train a neural network model through unsupervised learning that finds out a determination reference by performing training by itself using learning data without supervision. Further, the model learning unit 24 may train a neural network model through reinforcement learning using feedback about whether the result of situation determination according to learning is correct. Further, the model learning unit 24 may train a neural network model using a learning algorithm including error back-propagation or gradient decent.

When the neural network model is trained, the model training unit 24 may store the trained neural network model in a memory. The model training unit 24 may store the trained neural network model in the memory of the server connected to the AI device 20 through a wired or wireless network.

The data learning unit 22 may further include a learning data preprocessor (not shown) and a learning data selector (not shown) to improve the analysis result of a recognition model or reduce resources or time for generating a recognition model.

The learning data preprocessor may preprocess acquired data such that the acquired data may be used in learning for situation determination. For example, the learning data preprocessor may process acquired data in a predetermined format such that the model learning unit 24 may use learning data acquired for learning for image recognition.

Further, the learning data selector may select data for learning from the learning data acquired by the learning data acquiring unit 23 or the learning data preprocessed by the preprocessor. The selected learning data may be provided to the model learning unit 24. For example, the learning data selector may select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it may make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator may estimate that a predetermined reference is not satisfied.

The communication unit 27 may transmit the AI processing result of the AI processor 21 to an external electronic device. For example, the external electronic device may include a surveillance camera, a Bluetooth device, an autonomous vehicle, a robot, a drone, an AR (augmented reality) device, a mobile device, a home appliance, and the like.

Meanwhile, the AI device 20 shown in FIG. 2 has been functionally divided into the AI processor 21, the memory 25, the communication unit 27, and the like, but the aforementioned components are integrated as one module and it may also be called an AI module.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 3:
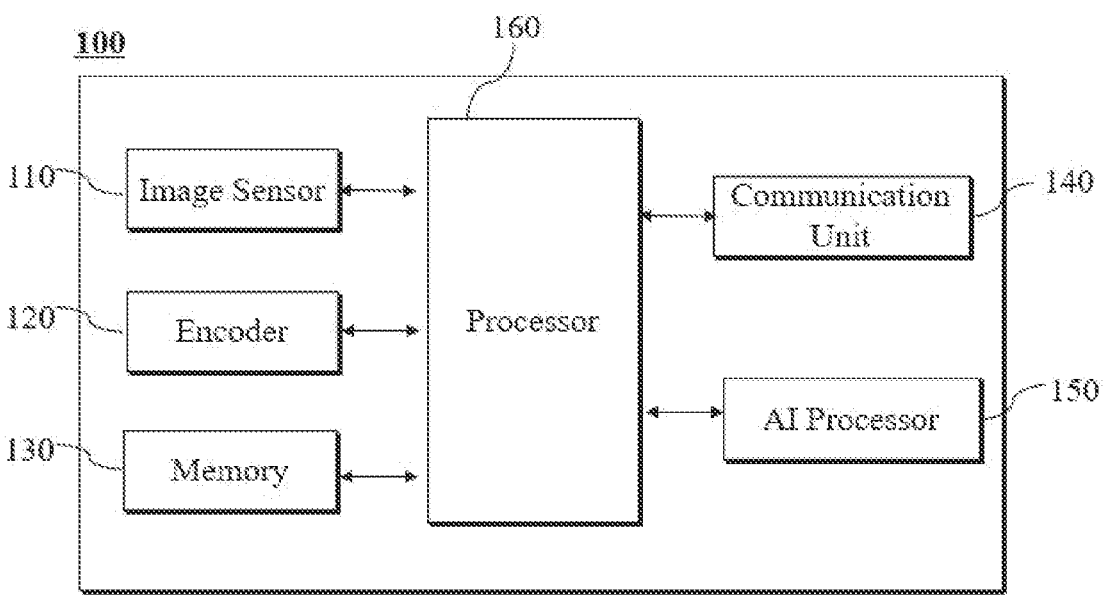
FIG. 3 is a view for illustrating a surveillance camera according to an example of the present disclosure.

FIG. 3 is a block diagram illustrating a configuration of the image capturing device shown in FIG. 1.

Referring to FIG. 3, as an example, a image capturing device 100 is a network camera that performs an intelligent image analysis function and generates a signal of the image analysis, but the operation of the network surveillance camera system according to an example of the present disclosure is not limited thereto.

The image capturing device 100 includes an image sensor 110, an encoder 120, a memory 130, a communication interface 140, AI processor 150, a processor 160.

The image sensor 110 performs a function of acquiring an image by photographing a surveillance region, and may be implemented with, for example, a CCD (Charge-Coupled Device) sensor, a CMOS (Complementary Metal-Oxide-Semiconductor) sensor, and the like.

The encoder 120 performs an operation of encoding the image acquired through the image sensor 110 into a digital signal, based on, for example, H.264, H.265, MPEG (Moving Picture Experts Group), M-JPEG (Motion Joint Photographic Experts Group) standards or the like.

The memory 130 may store image data, audio data, still images, metadata, and the like. As mentioned above, the metadata may be text-based data including object detection information (movement, sound, intrusion into a designated area, etc.) and object identification information (person, car, face, hat, clothes, etc.) photographed in the surveillance region, and a detected location information (coordinates, size, etc.).

In addition, the still image is generated together with the text-based metadata and stored in the memory 130, and may be generated by capturing image information for a specific analysis region among the image analysis information. For example, the still image may be implemented as a JPEG image file.

For example, the still image may be generated by cropping a specific region of the image data determined to be an identifiable object among the image data of the surveillance area detected for a specific region and a specific period, and may be transmitted in real time together with the text-based metadata.

The communication unit 140 transmits the image data, audio data, still image, and/or metadata to the image receiving/searching device. The communication unit 140 according to an example may transmit image data, audio data, still images, and/or metadata to the image receiving device 300 in real time. The communication interface may perform at least one communication function among wired and wireless LAN (Local Area Network), Wi-Fi, ZigBee, Bluetooth, and Near Field Communication.

The AI processor 150 is designed for an artificial intelligence image processing and applies a deep learning based object detection algorithm which is learned in the image acquired through the surveillance camera system according to an example of the present disclosure. The AI processor 150 may be implemented as an integral module with the processor 260 that controls the overall system or an independent module.

Figure 4:
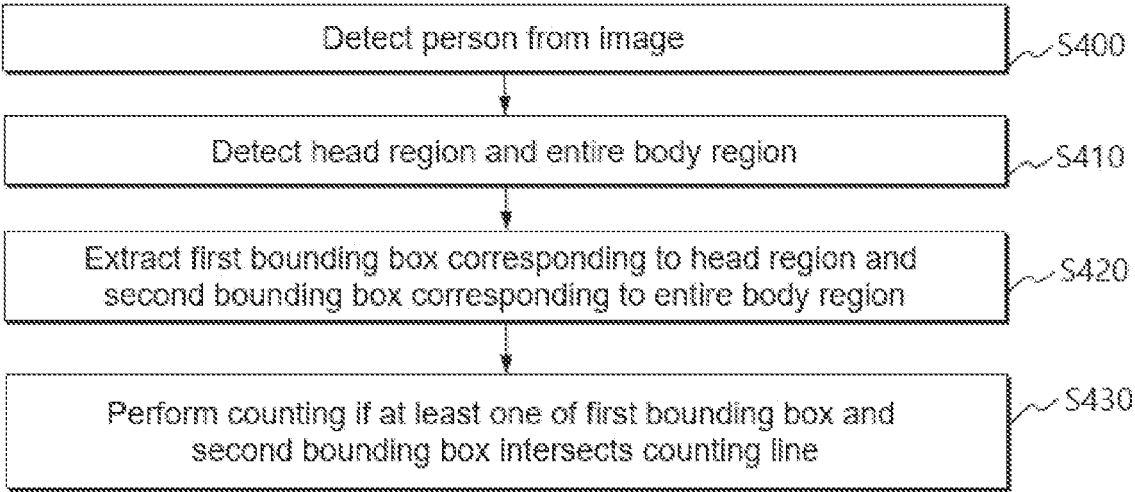
FIG. 4 is a flowchart of a control method for a surveillance camera according to an example of the present disclosure.

FIG. 4 is a flowchart of a control method for a surveillance camera according to an example of the present disclosure. The surveillance camera control method may be implemented by the processor 160 illustrated in FIG. 3. Incidentally, a surveillance camera according to an example of the present disclosure is a type of surveillance camera that provides a side view, rather than being a camera that is fixed to a ceiling and provides a top view image. Accordingly, when the surveillance camera is installed to a ceiling in an indoor space, it does not mean that the camera is directed vertically from the ground while fixed to the ceiling by a fixing means, but it may mean that the camera is oriented within a predetermined range of angles from the ceiling so as to obtain an image.

Referring to FIG. 4, the processor 160 may detect an object (preferably, a person) in an image obtained by an image sensor (S400). The object recognition algorithm explained with respect to FIG. 2 may be used as an algorithm for detecting the object (person). Also, the surveillance camera according to an example of the present disclosure may recognize a detected object as a human by detecting the head (hereinafter, referred to as the head region) of the person through the object recognition algorithm. It should be noted that a process of identifying whether the detected object is a human via the head region is merely illustrative but not intended to limit the present disclosure. The present disclosure allows for identifying whether a detected object is a human or not by using a human recognition algorithm which is adopted for various object recognition algorithms.

The processor 160 may detect a head region and entire body region of a detected person (S410). According to an example, the processor 160 may display, in the head region, a first bounding box corresponding to the head region and display, in the detected entire body region, a second bounding box corresponding to the entire body region (S420).

Since the first bounding box is an area that corresponds to the head of a particular person, the relative positions of the first bounding box and the second bounding box may be set in such a way that the first bounding box is contained in the second bounding box. Incidentally, at least part of the first bounding box may be configured to overlap with at least part of the second bounding box based on the orientation, etc. of a camera that provides a side view.

The processor 160 may perform up-counting if at least one of the first bounding box and the second bounding box intersects a preset counting line (S430). According to an example, the processor 160 may perform up-counting if the first bounding box including the head of the person intersects the counting line. According to an example, the processor 160 may perform up-counting if the second bounding box including the entire body region of the person intersects the counting line. According to an example, the processor

160 may perform up-counting if the first bounding box and the second bounding box intersect the counting line.

According to an example, the processor 160 may perform up-counting when the trajectory of at least one of the first bounding box and the second bounding box traverses the counting line. Here, the trajectory of the first bounding box or the second bounding box may refer to a path followed by the center point of the bounding box that has passed as the object moves past the counting line. According to an example, the processor 160 may perform up-counting if the second bounding box intersects the counting line at at least one point the instant the first bounding box traverses the counting line.

Figure 5:
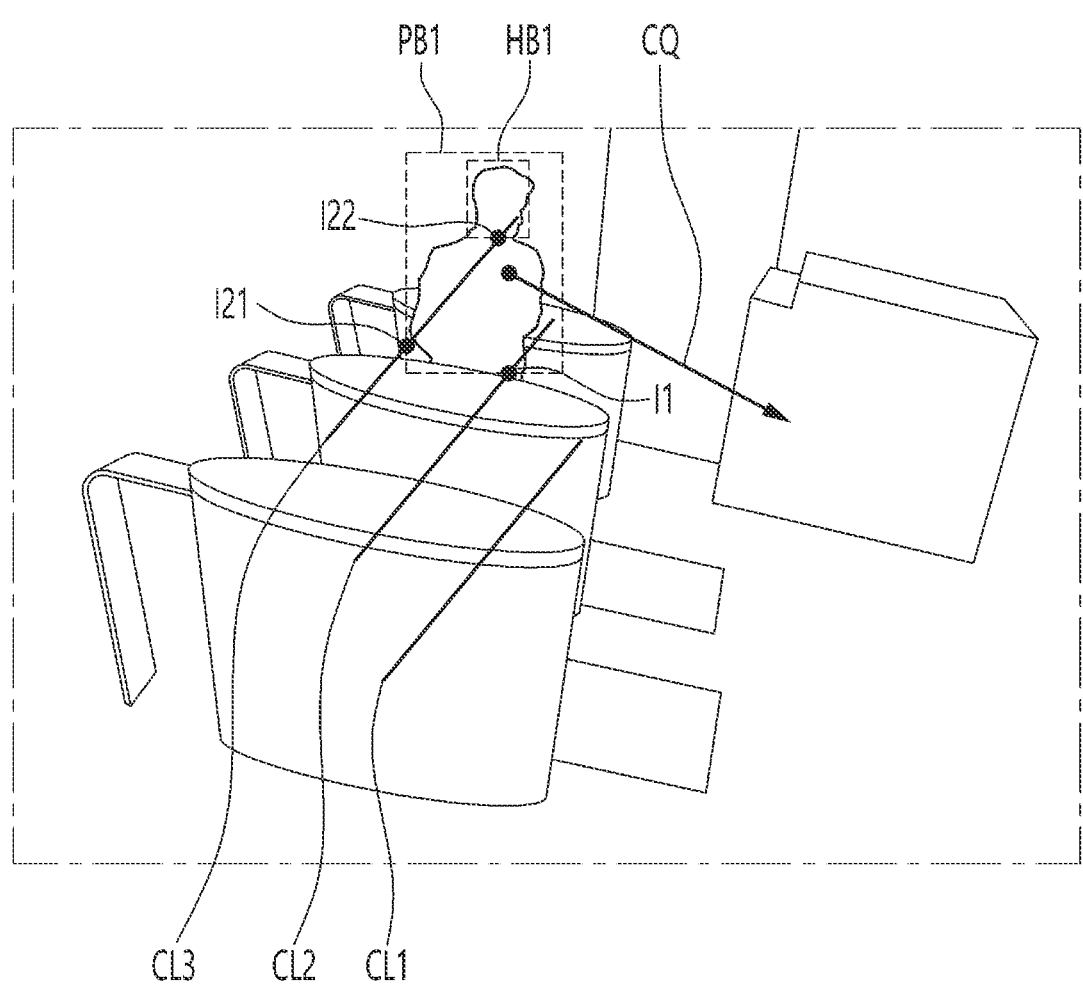
FIGS. 5 to 7 are view for illustrating an example of performing object counting based on a bounding box in an actual image according to an example of the present disclosure.
Figure 6:
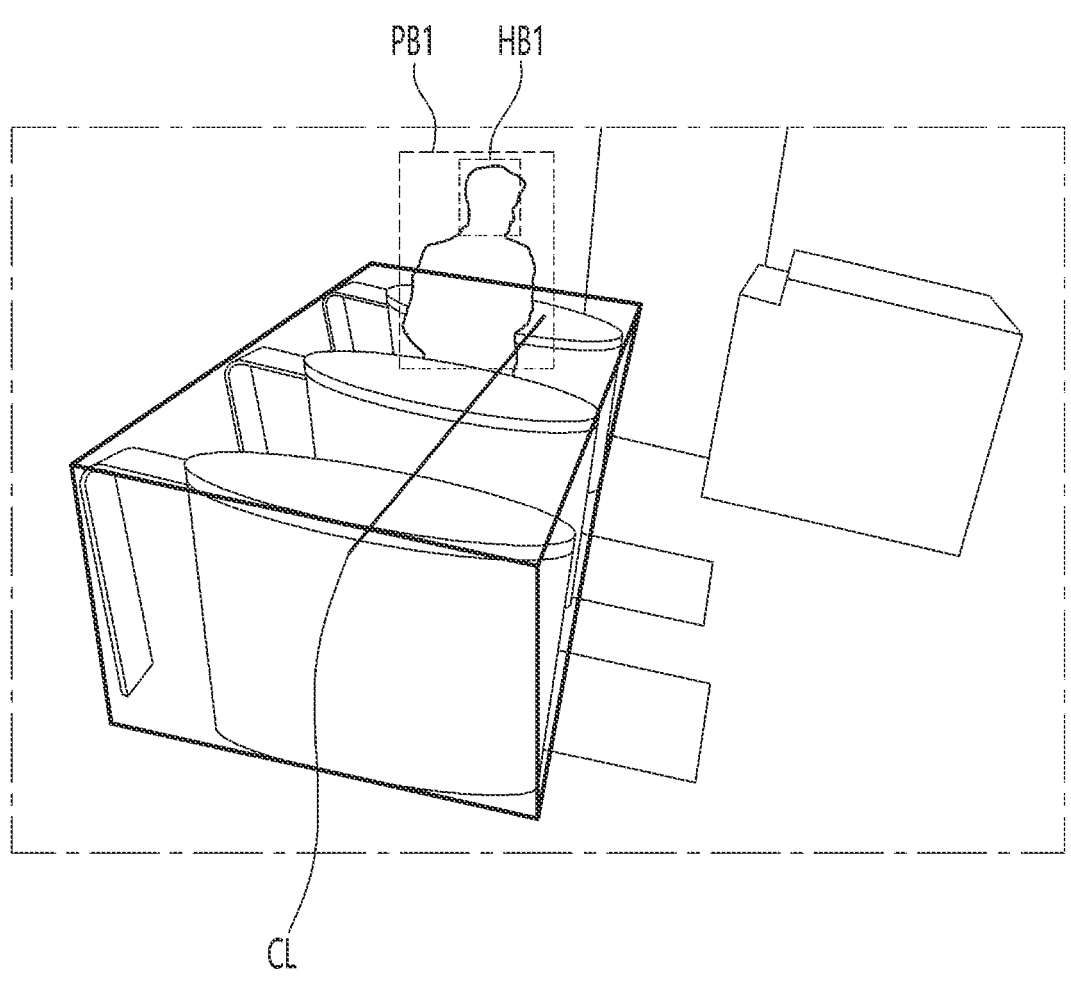
Figure 7:
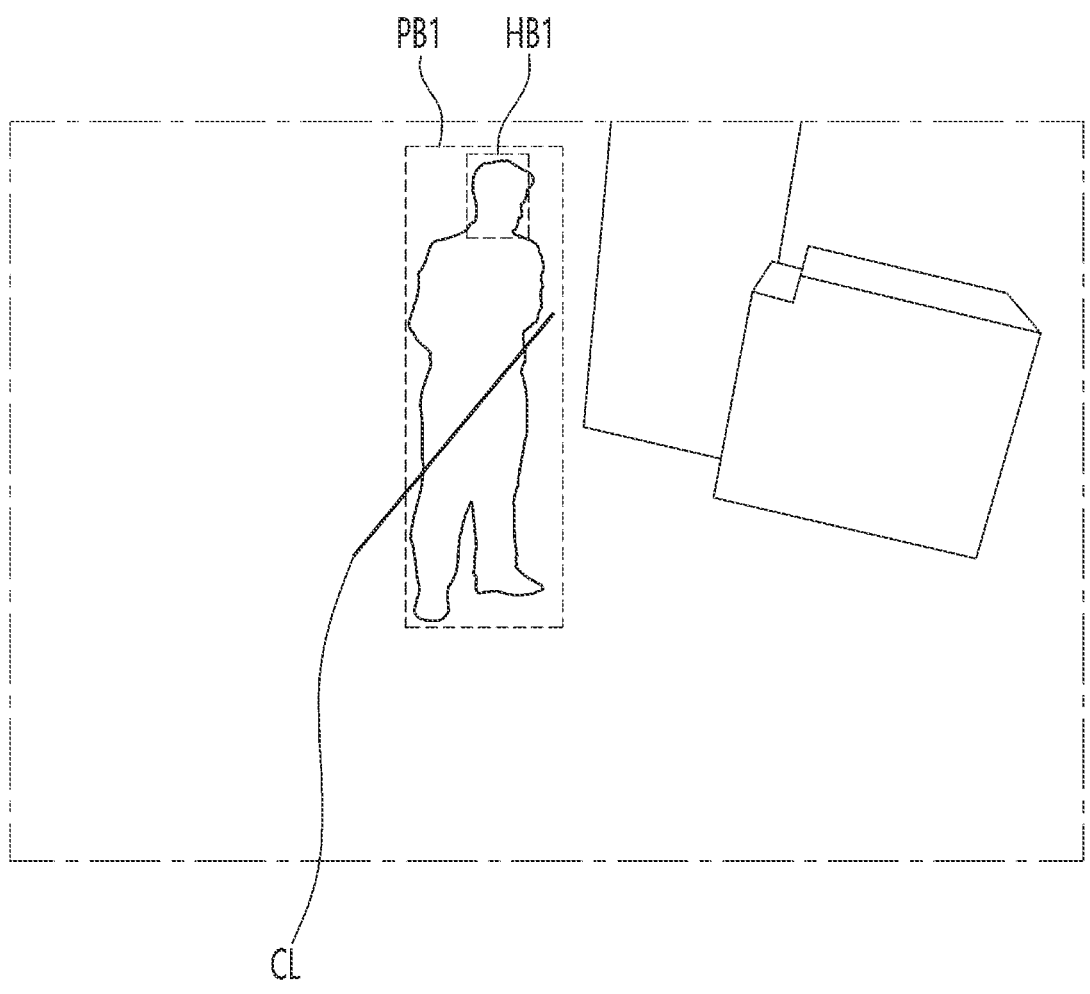

FIGS. 5 to 7 are views for illustrating an example of performing object counting based on a bounding box in an actual image according to an example of the present disclosure.

Referring to FIG. 5, an image obtained through a surveillance image capturing device includes a side view image. The side view image may refer to an image that provides a recognized representation of the entire body of a person detected from the image, which is distinguished from a top view as stated previously. To this end, the angle of orientation of a surveillance image capturing device lens is not perpendicular to the ground but may be fixed such that it makes a predetermined angle with the ground. In the present disclosure, counting lines CL1, CL2, and CL3 for detecting the entry of people may be set for the purpose of counting people entering an entrance area. As for the counting lines CL1, CL2, and CL3 depicted in FIG. 5, it is described a plurality of counting lines are present in a single image for convenience of explanation. Under an actual surveillance image capturing device environment, however, a single counting line may be set in a single image to perform a people counting operation.

The counting lines CL1, CL2, and CL3 may be set in an obtained image via user input. The user input may include a drag input on an image shown on a display. An input limiting setting may be configured such that the drag input is applied only to the entrance area.

Once a person is recognized in an image according to an example of the present disclosure, a first bounding box HB1 corresponding to the head region of the person and a second bounding box PB1 corresponding to the entire body region of the person may be provided separately. If these bounding boxes are for the same person, the first bonding box HB1 may be contained in the second bounding box PB1. After extracting a center point from the first and/or second bounding box, the processor 160 may be configured to perform up-counting if a trajectory CQ followed by the center point traverses a counting line CL1, CL2, or CL3. When seen in a side view, as opposed to a top view, the length of a bounding box that indicates an object recognition result may correspond to the entire length of the recognized object. In this case, even if the object passes through a counting line, there may be no point of intersection between the trajectory CQ followed by the center point of the bounding box of the object and the counting line. For example, the trajectory CQ followed by the center point of a bounding box of the object intersects the third counting line CL3, but it does not intersect the second counting line CL2. Accordingly, if the second counting line CL2 is set via user input, the surveillance camera is not able to count a person who actually has passed through the counting line.

Therefore, the present disclosure proposes a method of performing counting by checking whether a counting line is intersected by a bounding box itself, rather than a trajectory followed by the center point of the bounding box. Meanwhile, in the present disclosure, two types of bounding boxes may be applied to a single object as described previously—that is, a first bounding box HB1 corresponding to the head region of a person and a second bounding box PB1 corresponding to the entire body region. Here, the first bounding box HB1 may perform a function of additionally recognizing whether a recognized object is a human or not, by recognizing the head of the person. For example, if the recognized object is a moving animal, the second bounding box PB1 is indicated on the recognized object, but the first bounding box HB1 may not be indicated. The present disclosure proposes a method in which both first and second bounding boxes of a recognized object are used for object counting.

According to an example, if the third counting line CL3 is set via user input, the first bounding box HB intersects the third counting line CL3 at a point 122 when the recognized person passes through the entrance area. Also, the second bounding box PB1 intersects the third counting line CL3 at a point 121. The processor 160 is able to perform up-counting if at least one of the first bounding box HB1 and the second bounding box PB1 intersects the third counting line CL3.

Moreover, according to an example, if the second counting line CL2 is set via user input, there is no point of intersection between the first bounding box HB1 and the second counting line CL2, but the second bounding box PB1 intersects the second counting line CL2 at a point I1. Accordingly, the processor 160 may perform an up-counting operation.

According to an example of the present disclosure, a counting line may be set via user input, as with the first counting line CL1. Although the first counting line CL1 depicted in FIG. is set in the entrance area, there exists no point where it intersects the first and second bounding boxes because it is positioned lower than the height of an entrance door installed in the entrance area. Thus, if the first counting line CL1 is positioned lower than the height of the entrance door, the processor 160 may set the counting line in such a way its height is automatically adjusted to the height of the entrance door.

FIG. 6 is a view for illustrating another example of setting a counting line. Upon receiving an input for selecting an entrance area in an obtained image, the processor 160 may provide a result that recognizes an entrance door as an object. The processor 160 may give the entrance door a visually distinct look along a boundary so that the user uses it as reference when setting a counting line. Meanwhile, the processor 160 may provide first and second bounding boxes HB1 and PB1 of the recognized object, along with the entrance door recognition result, so as to be used as reference when setting the height of the counting line. According to an example, upon receiving an input for selecting an entrance door bounding box, the processor 160 may automatically set a counting line CL and display it on the image. Meanwhile, as depicted in FIG. 7, if the counting line CL is positioned lower than the height of the entrance door, the counting line CL may be adjusted such that its position is automatically set higher than the height of the entrance door.

The foregoing description has been made on an instance of utilizing bounding boxes of a recognized object and a counting line to an object up-counting operation to count the number of moving objects according to an example of the present disclosure with reference to FIGS. 5 to 7. Now, a method of counting objects by a surveillance camera according to an example of the present disclosure will be described in more detail.

Figure 8:
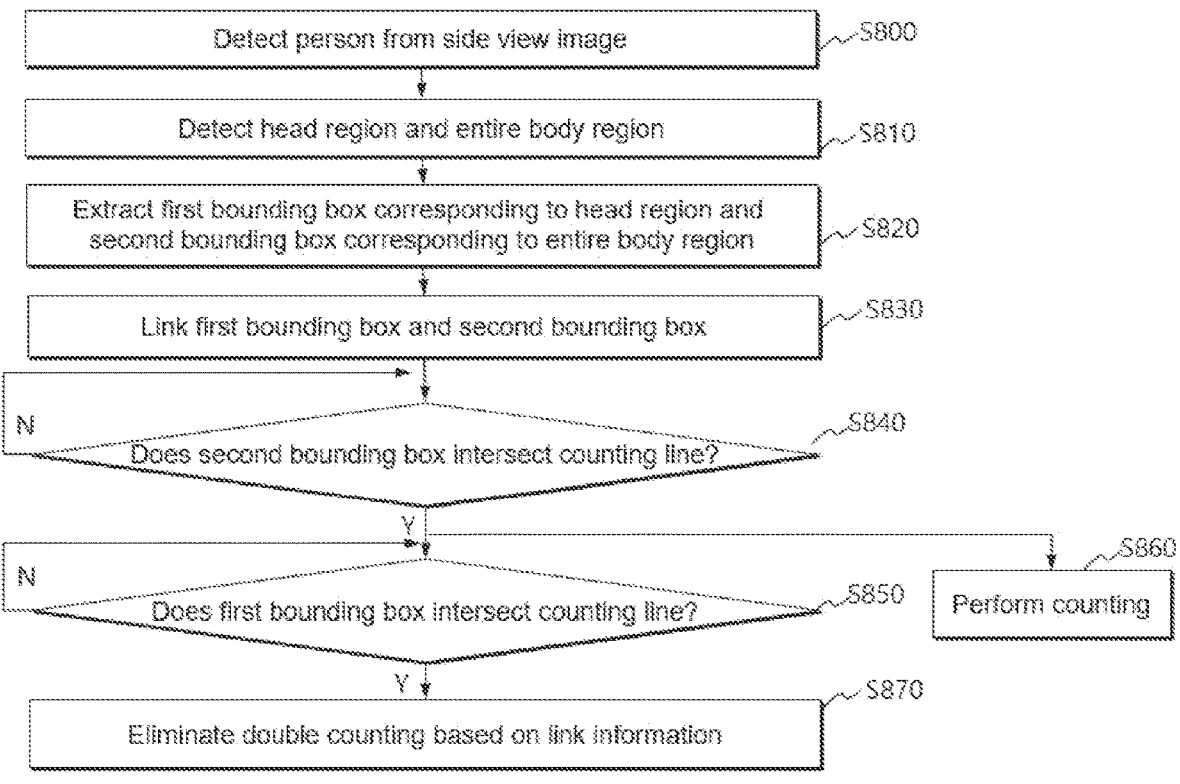
FIG. 8 is a flowchart of a control method for a surveillance camera according to another example of the present disclosure.

FIG. 8 is a flowchart of a control method for a surveillance camera according to another example of the present disclosure. The surveillance camera control method of FIG. 8 may be implemented through the processor 160 of FIG. 3.

Referring to FIG. 8, the processor 160 may detect a person from a side view image (S800). The processor 160 may detect a head region and entire body region of the detected person and distinguish between them (S810). The processor 160 may extract a first bounding box corresponding to the head region and a second bounding box corresponding to the entire body region, respectively (S820).

The processor 160 may perform an operation of linking the first bounding box and the second bounding box (S830). If a plurality of regions are detected separately for the same object, the linking operation may be an operation for recognizing that the detected regions are from the same object.

The processor 160 may determine whether the second bounding box intersects a counting line (S840). The second bounding box corresponds to the entire body region, and if it is determined that the second bounding box intersects a counting line preset by the user, the processor 160 may perform up-counting (S860).

Meanwhile, if it is determined that, after the second bounding box intersects a counting line, the first bounding box corresponding to the head region intersects the counting line as the person moves toward the entrance door (S850: Y), the processor 160 may perform an operation of eliminating double counting based on link information (S870).

According to an example of the present disclosure, a people counting operation relies on whether a bounding box and a counting line intersect, and there may be two types of bounding boxes including the one for the head region and the one for the entire body region. The bounding box for the head region is usually present within the bounding box for the entire body region. If up-counting is performed using the bounding box for the head region after up-counting is performed using the bounding box for the entire body region, this means that double counting is performed for the same person. Thus, in the present disclosure, if the two types of bounding boxes originate from the same object, these two types of bounding boxes may be linked to each other and used for eliminating double counting.

Figure 9:
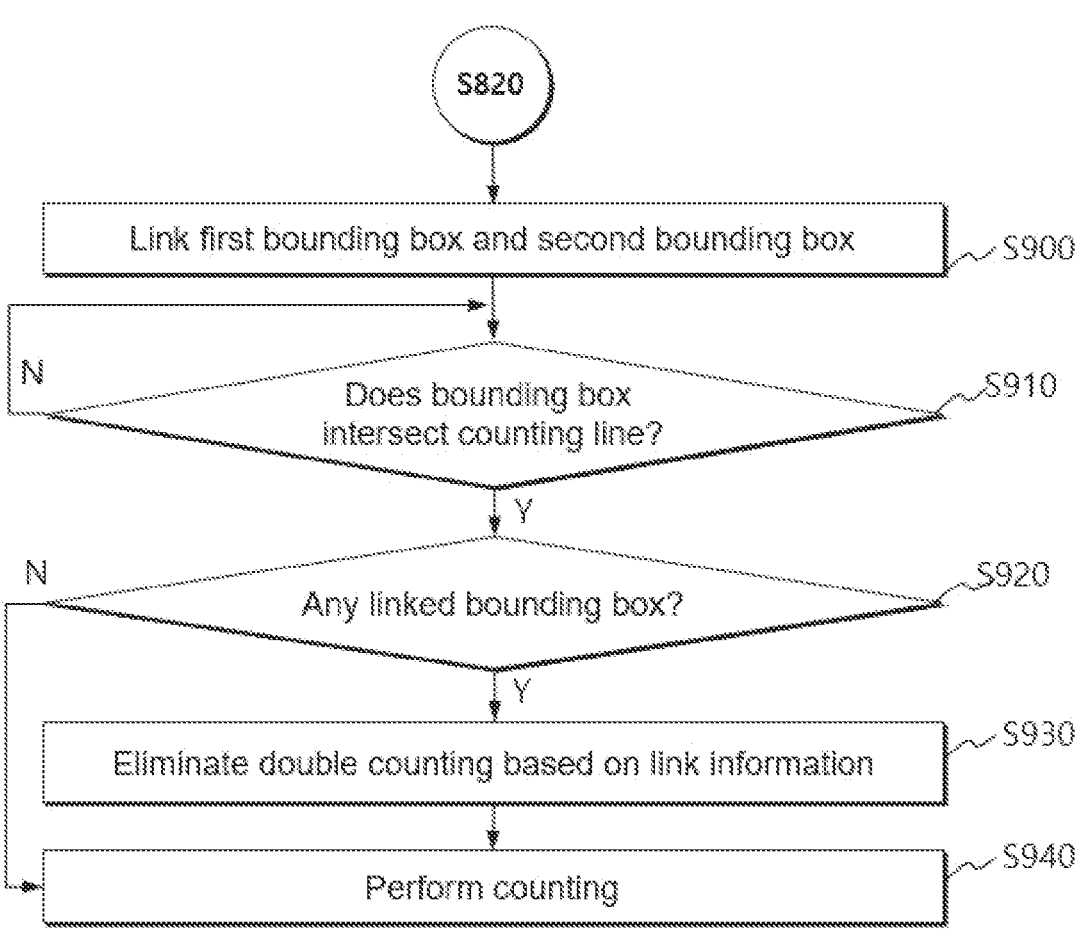
FIG. 9 is a flowchart of a control method for a surveillance camera according to yet another example of the present disclosure.

FIG. 9 is a flowchart of a control method for a surveillance camera according to yet another example of the present disclosure.

Referring to FIG. 9, the processor 160 may extract a first bounding box and a second bounding box for a particular object (S820), and then, if the first bounding box and the second bounding box originate from the same object, may perform an operation of linking the two bounding boxes (S900).

If it is determined that a bounding box intersects a counting line (S910: Y), the processor 160 also may determine whether there is a bounding box linked to the bounding box (S920). If there is another bounding box which is linked to the bounding box intersecting the counting line, the processor 160 may eliminate the double counting operation based on the link information (S930). That is, according to an example of the present disclosure, if a bounding box of the object intersects a counting line at least one point as the object passes through the counting line, the processor 160 performs primary counting. Incidentally, as stated previously, there may be two types of bounding boxes for the same object, including the one for the head region and the one for the entire body region. Upon detecting that each bounding box intersects a counting line, the processor 160 may start up-counting and then continue the up-counting (S940) in such a way that double counting is eliminated based on the link information (S930).

Figure 10:
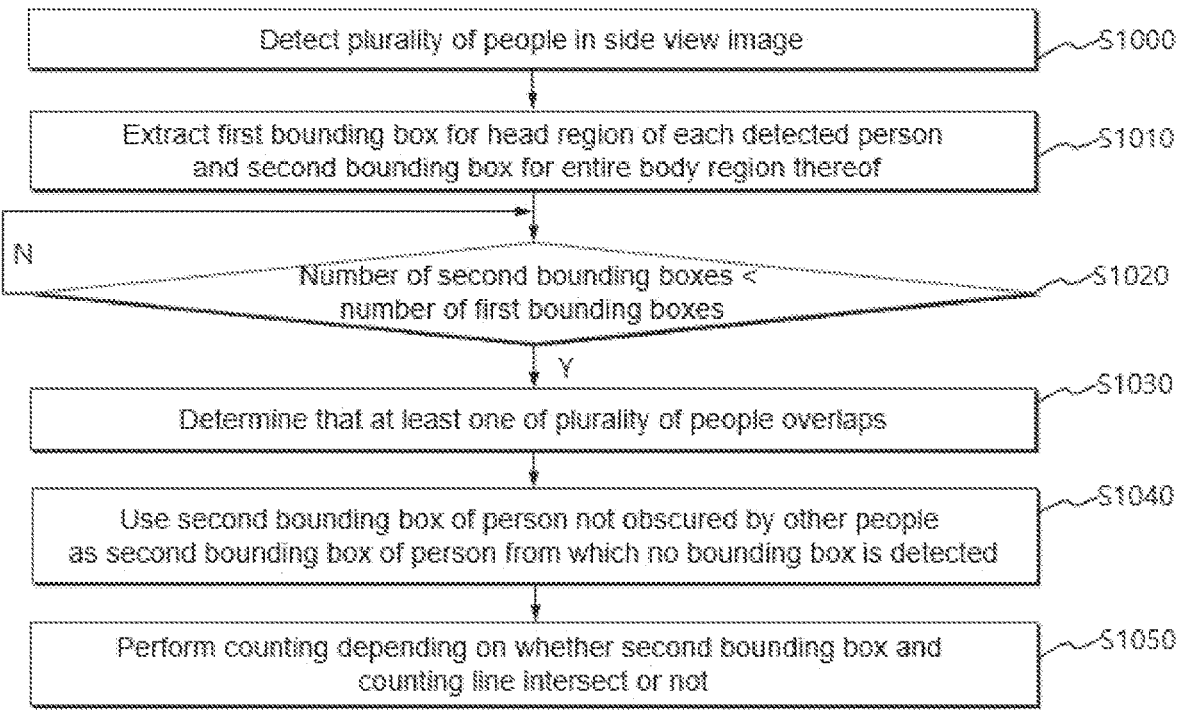
FIG. 10 is a flowchart of a control method for a surveillance camera according to a further example of the present disclosure.
Figure 11:
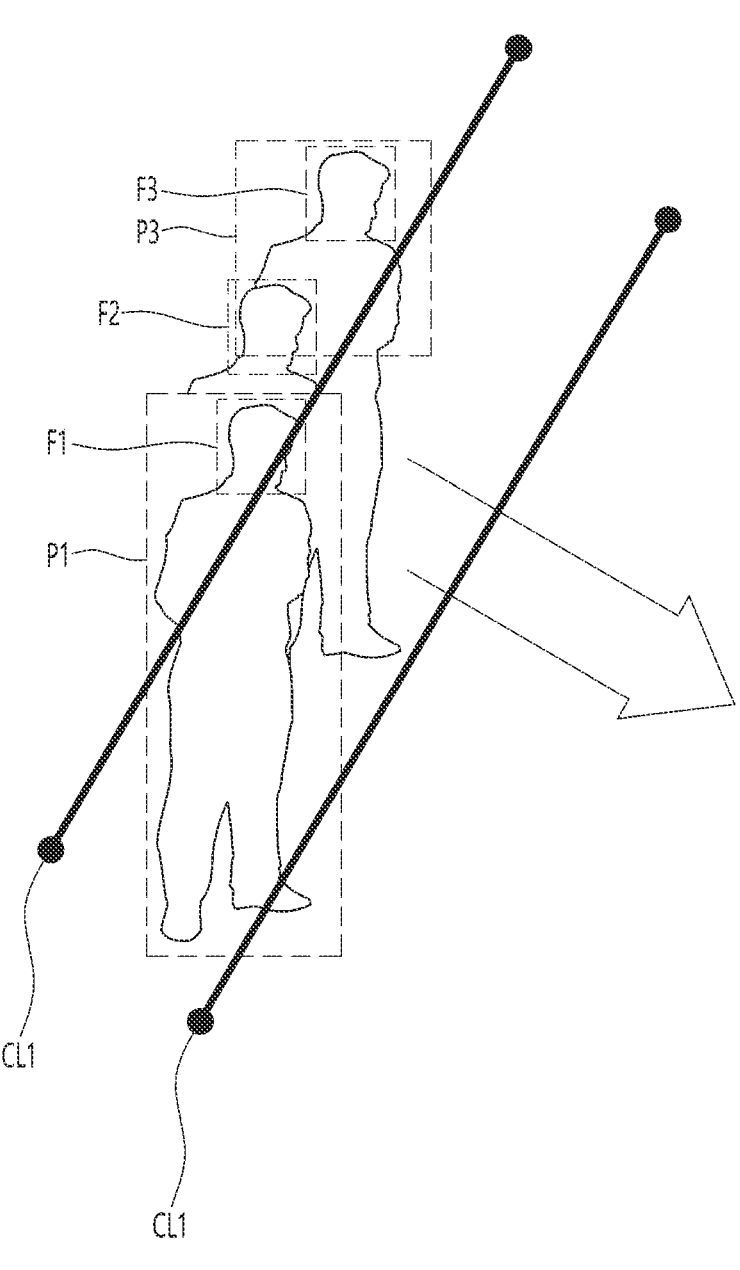
FIG. 11 is a view for illustrating an example of counting objects when the objects overlap with one another in a side view image according to an example of the present disclosure.

FIG. 10 is a flowchart of a control method for a surveillance camera according to a further example of the present disclosure. FIG. 11 is a view for illustrating an example of counting objects when the objects overlap with one another in a side view image according to an example of the present disclosure.

Referring to FIGS. 10 to 11, the processor 160 detects a plurality of people in a side view image according to an example (S1000). At least some of the plurality of people may move toward the entrance while obscured by people in front of them. In this case, the processor 160 may detect both a first bounding box F1 and a second bounding box P1 for the first person in line, and also may detect head regions of the second and third persons in line but not their entire body regions. In this instance, when the three people move toward the entrance (in the direction of a counting line, as indicated by the arrow in FIG. 11), the second and third persons may have bounding boxes F2 and F3 for the head region, but these bounding boxes F2 and F3 may not intersect the counting line depending on the position of the counting line.

For example, in the case of the first counting line CL1, even if there are no bounding boxes detected for the entire body regions of the second and third persons, the processor 160 may count all the three people since the bounding boxes F2 and F3 for the head region and the first counting line CL1 intersect.

However, if the counting line CL2 is set by the user, the processor 160 may perform up-counting of the first person since the bounding box P1 of the entire body region and the first counting line CL1 intersect, but the processor 160 is not able to count the second and third persons even though they have passed through the counting line. Thus, according to another example of the present disclosure, the processor 160 may assume that the second and third persons have bounding boxes for the entire body region that are identical to the bounding box P1 for the entire body region of the first person, and generate a virtual bounding box for their entire body region. As the objects move, the processor 160 may count the second and third persons by recognizing that the virtual bounding box for the entire body region and the second counting line CL2 intersect.

Meanwhile, according to an example, the processor 160 may selectively use either the first bounding box F1, F2, and F3 or the second bounding box P1 and P3 to determine whether the applied bounding box intersects a counting line. According to an example, if the first counting line CL1 is set by the user, the processor 160 may perform a counting operation by determining whether the first bounding box F1, F2, and F3 intersects the first counting line CL1.

Meanwhile, according to an example of the present disclosure, the processor 160 may determine that two objects overlap with each other by comparing the number of first bounding boxes and the number of second bounding boxes detected for the same object.

According to an example, the processor 160 may detect a plurality of people (S1000), and then extract a first bounding box for the head region of each detected person and a second bounding box for the entire body region thereof (S1010). Afterwards, if it is determined that the same object has more first bounding boxes than second bounding boxes (S1020: Y), the processor 160 may determine that at least one of the detected people overlaps (S1030). For example, since the second person in FIG. 11 has a first bounding box F but no second bounding box, the second person may be deemed to be obscured by the first person. Also, according to an example, FIG. 11 shows that there are three first bounding boxes which correspond to three different people, respectively, and there are two second bounding boxes. Accordingly, the processor 160 may determine that at least one of the three different people is obscured by at least one other person.

Once it is determined that a particular object is obscured by the other objects, the processor 160 may use the second bounding box (e.g., P1) of a person (e.g., first person) not obscured by other people as the second bounding box of a person (e.g., second person) obscured by overlapping with another person (S1040).

The processor 160 may perform counting by utilizing the replaced second bounding box to an object with no second bounding box that is obscured by a particular object to check whether it intersects a counting line (S1050). That is, although no second bounding box is detected from the second person, the second bounding box of the first person may be applied to determine whether it intersects a counting line.

Figure 12:
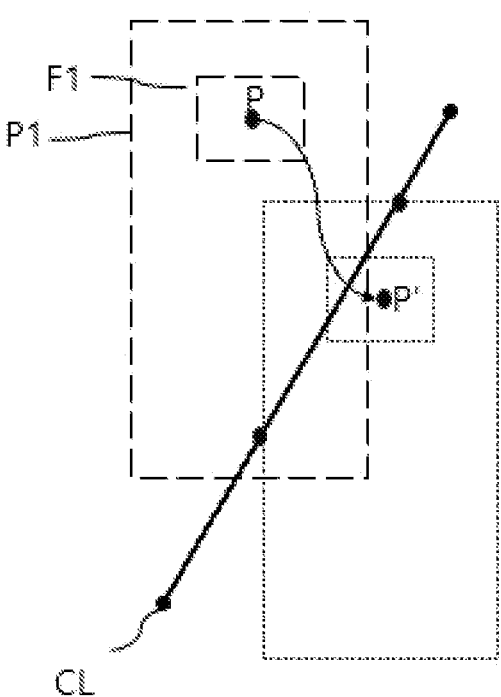
FIG. 12 is a view for illustrating a control method for a surveillance camera according to a further example of the present disclosure.

FIG. 12 is a view for illustrating a control method for a surveillance camera according to a further example of the present disclosure. The example disclosed in FIG. 12 is an example of performing counting by considering both the first bounding box F1 and the second bounding box Pb. The processor 160 may perform up-counting if the second bounding box P1 (person) intersects the counting line at a point the instant the first bounding box F1 (head) traverses the counting line.

The present disclosure described above may be implemented as computer-readable codes on a medium in which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), ROM, RAM, CD-ROM, a magnetic tape, a floppy disk, and an optical data storage device, and other implementations in the form of carrier waves (e.g., transmission over the Internet). Therefore, the above detailed description should not be construed as limited in all respects but should be considered as exemplary. The scope of the present disclosure should be determined by reasonable interpretation of the appended claims, and all changes within the equivalent scope of the present disclosure are contained in the scope of the present disclosure.

What is claimed is:

1. A surveillance camera comprising:
an image sensor;
a processor configured to detect a head region and an entire body region;
the processor configured to determine a first bounding box corresponding to the head region and a second bounding box corresponding to the entire body region, respectively, of a person detected from an image obtained by the image sensor;
the processor configured to perform counting as at least one of the first bounding box and the second bounding box intersects at least one preset counting line,
wherein, as the first bounding box and the second bounding box originate from the same object, the processor controls the counting to be performed based on only either the first bounding box or the second bounding box.

2. The surveillance camera of claim 1, wherein the processor determines that the first bounding box and the second bounding box originated from the same object, and the processor links the first and second bounding boxes to each other.

3. The surveillance camera of claim 2, wherein the processor determines that the first bounding box is contained in the second bounding box, and the processor determines that the first bounding box and the second bounding box originated from the same object.

4. The surveillance camera of claim 1, wherein the processor performs up-counting as at least one point of the second bounding box intersects the counting line while the first bounding box traverses the counting line.

5. The surveillance camera of claim 1, wherein the processor selects either the first bounding box or the second bounding box depending on the counting line closest to the object to determine whether the selected bounding box intersects the counting line.

6. The surveillance camera of claim 1, wherein the processor selects either the first bounding box or the second bounding box depending on the height of the counting line to determine whether the selected bounding box intersects the counting line.

7. The surveillance camera of claim 1, wherein, as a plurality of different objects simultaneously traverse the counting line, and at least one of the plurality of objects overlaps with at least one other object, for the plurality of overlapping objects, the first bounding box is utilized in determining whether the plurality of overlapping objects intersect the counting line.

8. The surveillance camera of claim 7, wherein, as there are more first bounding boxes for the plurality of objects than second bounding boxes, the processor determines that the at least one object overlaps with at least one other object.

9. A surveillance camera comprising:
an image sensor; and
a processor configured to perform counting as at least one of a first bounding box and a second bounding box intersects at least one preset counting line,
wherein the first bounding box indicates a head region and the second bounding box indicates entire body region, respectively, of a person detected from an image obtained by the image sensor,
wherein, as the first bounding box and the second bounding box originate from the same object, the processor controls the counting to be performed based on only either the first bounding box or the second bounding box,
wherein, as a plurality of different objects simultaneously traverse the counting line, and no second bounding box is detected from at least one of the plurality of objects, the processor applies a virtual second bounding box and determines whether the virtual second bounding box intersects the counting line.

10. The surveillance camera of claim 1, wherein the processor recognizes the type of the counted object and outputs an alarm if the object is not authorized for access.

11. The surveillance camera of claim 1, wherein the counting line is set within the image based on a predetermined user input.

12. The surveillance camera of claim 11, wherein the processor recognizes an entrance area within the image, and upon receiving an input for designating the entrance area, automatically sets the counting line to a position corresponding to the entrance area, wherein the processor automatically sets the counting line to the height of the entrance area.

13. A control method for a surveillance camera, the control method comprising:

detecting a person in a side view image wherein an entire body of the detected person including a face of the detected person can be recognized;

detecting a head region and entire body region of the detected person;

extracting a first bounding box corresponding to the head region and a second bounding box corresponding to the entire body region;

performing counting as the second bounding box intersects a preset counting line; and performing counting as the first bounding box intersects the counting line but there is no bounding box linked to the first bounding box.

14. The control method of claim 13, further comprising linking the first and second bounding boxes to each other as the first bounding box and the second bounding box originate from the same object.

15. The control method of claim 13, wherein the first bounding box is contained in the second bounding box.

16. The control method of claim 13, further comprising:

detecting the first bounding box traversing the counting line; and performing counting as the second bounding box intersects the counting line at at least one point the instant the first bounding box traverses the counting line.

17. The control method of claim 13, further comprising, as the object is proximate to an end of the preset counting line, selecting the second bounding box to determine whether the second bounding box intersects the counting line and performing counting.

18. The control method of claim 13, further comprising selecting either the first bounding box or the second bounding box based on the relative heights of the preset counting line and the object to determine whether the selected bounding box intersects the counting line.

* * * * *